US007806757B2

(12) United States Patent
Coers et al.

(10) Patent No.: US 7,806,757 B2
(45) Date of Patent: Oct. 5, 2010

(54) DUAL SIDED BELTED UNLOADER

(75) Inventors: Bruce A. Coers, Hillsdale, IL (US);
Daniel J. Burke, Cordova, IL (US);
Ryan P. Mackin, Milan, IL (US); Shane Anderson, Syracuse, UT (US); David Rix, Sandy, UT (US)

(73) Assignee: Deere & Company, Moline, IL (US)

( * ) Notice: Subject to any disclaimer, the term of this patent is extended or adjusted under 35 U.S.C. 154(b) by 33 days.

(21) Appl. No.: 12/174,042

(22) Filed: Jul. 16, 2008

(65) Prior Publication Data

US 2010/0016047 A1 Jan. 21, 2010

(51) Int. Cl.
*A01D 17/02* (2006.01)
*A01F 12/46* (2006.01)

(52) U.S. Cl. .................. 460/114; 414/502
(58) Field of Classification Search .......... 3/114, 3/23; 198/660, 658, 666, 317, 318, 313, 198/301; 414/502, 526, 503, 334; 141/231, 141/256, 284
See application file for complete search history.

(56) References Cited

U.S. PATENT DOCUMENTS

| | | | | |
|---|---|---|---|---|
| 2,815,849 A * | 12/1957 | Zumbrunnen | ............... | 198/812 |
| 2,942,714 A * | 6/1960 | Glaser | ............... | 198/519 |
| 3,945,484 A * | 3/1976 | Oury | ............... | 198/313 |
| 4,169,536 A * | 10/1979 | Seem | ............... | 414/334 |
| 4,474,287 A * | 10/1984 | Thompson | ............... | 198/812 |
| 4,523,669 A * | 6/1985 | Smith | ............... | 198/313 |
| 4,624,357 A * | 11/1986 | Oury et al. | ............... | 198/313 |
| 4,643,299 A * | 2/1987 | Calundan | ............... | 198/812 |
| 5,203,442 A * | 4/1993 | Oury et al. | ............... | 198/313 |
| 5,307,917 A * | 5/1994 | Hall | ............... | 198/313 |
| 5,351,809 A * | 10/1994 | Gilmore et al. | ............... | 198/812 |
| 5,359,838 A * | 11/1994 | Madsen | ............... | 56/16.6 |
| 5,498,119 A * | 3/1996 | Faivre | ............... | 414/528 |
| 5,558,282 A * | 9/1996 | Ameye et al. | ............... | 241/60 |
| 5,575,316 A * | 11/1996 | Pollklas | ............... | 141/198 |
| 5,749,783 A * | 5/1998 | Pollklas | ............... | 460/119 |
| 5,857,907 A * | 1/1999 | Underwood | ............... | 460/114 |
| 5,984,077 A * | 11/1999 | Frye et al. | ............... | 198/317 |
| 6,233,911 B1* | 5/2001 | Dillon | ............... | 56/14.6 |
| 6,283,269 B1* | 9/2001 | Mayer | ............... | 198/313 |
| 6,339,917 B1* | 1/2002 | Dillon et al. | ............... | 56/14.6 |
| 6,360,876 B1* | 3/2002 | Nohl et al. | ............... | 198/588 |
| 6,543,622 B1* | 4/2003 | Fridman | ............... | 209/421 |
| 6,594,979 B2* | 7/2003 | Krone et al. | ............... | 56/16.6 |

(Continued)

FOREIGN PATENT DOCUMENTS

DE      19802199 A1    7/1999

(Continued)

OTHER PUBLICATIONS

European Search Report dated Nov. 10, 2009 (7 pages).

*Primary Examiner*—Árpád Fábián-Kovács
(74) *Attorney, Agent, or Firm*—Taylor IP, PC

(57) ABSTRACT

An unloader for an agricultural harvester includes a telescopic belted conveyor that can be extended to opposite sides of the harvester. The conveyor can be operated at any selected elevation between a minimum elevation and a maximum elevation and at any extended length between a minimum extended length and a maximum extended length for the conveyor.

20 Claims, 5 Drawing Sheets

U.S. PATENT DOCUMENTS

| | | | |
|---|---|---|---|
| 6,606,844 B2 * | 8/2003 | Dillon et al. | 56/14.6 |
| 6,638,159 B2 * | 10/2003 | Krone et al. | 460/114 |
| 6,725,996 B2 * | 4/2004 | Grundl | 198/314 |
| 6,805,229 B2 * | 10/2004 | Dekoning | 198/313 |
| 6,896,123 B1 * | 5/2005 | Horak | 198/812 |
| 6,929,113 B1 * | 8/2005 | Hoover et al. | 198/812 |
| 7,003,938 B2 * | 2/2006 | Erdmann et al. | 56/228 |
| 7,168,555 B2 * | 1/2007 | Peterson | 198/812 |
| 7,343,726 B2 * | 3/2008 | Hettiger et al. | 56/16.6 |
| 7,354,235 B2 * | 4/2008 | Hettiger | 414/304 |
| 7,455,173 B1 * | 11/2008 | Fridman et al. | 198/812 |
| 7,540,700 B2 * | 6/2009 | Hook | 414/505 |
| 2002/0011060 A1 | 1/2002 | Dillon | |
| 2003/0029694 A1 * | 2/2003 | Gilmore | 198/313 |
| 2004/0112719 A1 * | 6/2004 | Gilmore et al. | 198/812 |
| 2006/0018742 A1 * | 1/2006 | Hook | 414/502 |
| 2008/0283364 A1 * | 11/2008 | Laganiere | 198/581 |

FOREIGN PATENT DOCUMENTS

JP    11239413 A  *  9/1999

* cited by examiner

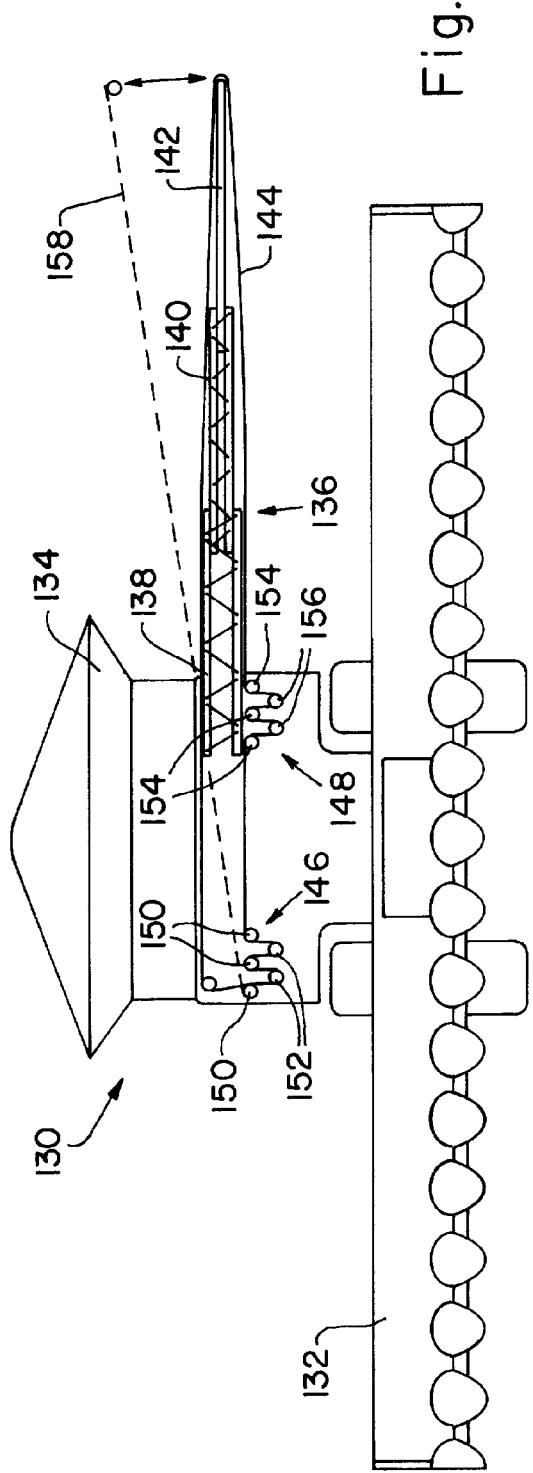
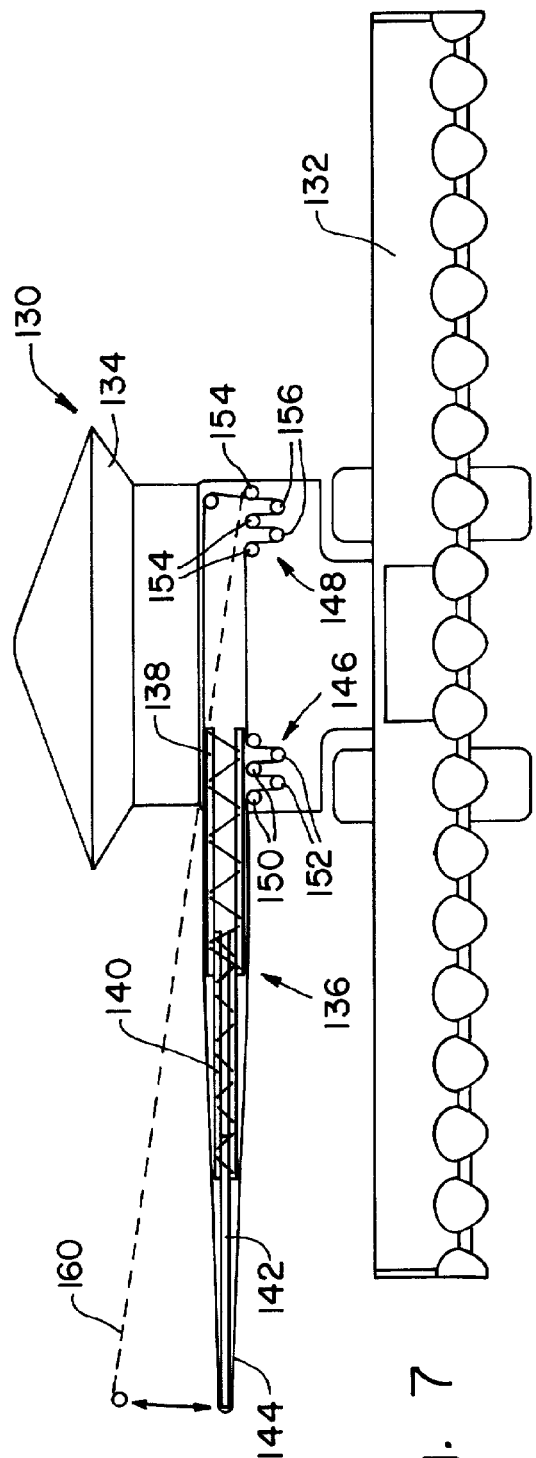

DUAL SIDED BELTED UNLOADER

FIELD OF THE INVENTION

The present invention relates to agricultural harvesters, and, more particularly, to unloading systems in such harvesters.

BACKGROUND OF THE INVENTION

Agricultural harvesters, such as combines, remove a crop material from the field, gather the crop material and transport it to a separator on the harvester. The separator removes the grain crop material from the non-grain crop material. The grain is cleaned and deposited in a grain tank on the harvester. When the grain tank becomes full, the harvester is positioned adjacent a vehicle into which the grain is to be unloaded, such as a semi-trailer, gravity wagon, truck, etc.; and an unloading system on the harvester is actuated to transfer the grain from the grain tank into the vehicle. It is known for the unloading system to include gravity discharge of the grain from the grain tank onto a conveyor for transport to an auger operable to only one side of the harvester so that the receiving vehicle must be positioned on that side of the harvester.

A trend in agricultural machines is for the size of the machines to become larger, reducing the number of passes required to cover a field. If the width of a harvester is increased, more grain is harvested during each pass over the field. Accordingly, the grain tank fills quickly. When breaking into a new field, or into a new area of a large field, if the harvester has made only a single pass or less than a complete pass through the field, there is no harvested area alongside the harvester in which to position the vehicle to receive the grain being transferred from the grain tank. So as not to trample non-harvested crop areas, wasting the grain therein, it is known to use the harvester to clear out an area in which to position vehicles for unloading. However, short area operation of a large harvester is difficult and inefficient. This process can be repeated several times across a large field to keep harvester travel times to a minimum on the ends of the field.

When the harvester operates back and forth in adjacent paths from one end of a field to an opposite end, if fields are long it may be necessary to unload the grain tank at locations intermediate the ends, with the harvester headed in either direction. Accordingly, it may be necessary to unload when the known unloading auger is on the side adjacent the non-harvested crop area. When this occurs, the harvester must be repositioned so that the receiving vehicle can be positioned in the harvested area.

What is needed in the art is an unloading system for a harvester that can be extended from the right or left side of the harvester so that the need for repositioning the harvester for unloading is reduced.

SUMMARY OF THE INVENTION

The present invention provides an unloader for an agricultural harvester which can be extended to either side of the harvester and can be angularly adjusted and extended for efficient unloading.

The invention in one form is directed to an agricultural harvester having a front, a back and first and second opposite sides. A grain tank on the harvester receives harvested grain. An unloader for moving grain from the grain tank off the harvester is extendable to each the first side and the second side of the harvester.

The invention in another form is directed to an unloader for an agricultural harvester having a grain tank thereon positioned between opposite sides of the harvester. The unloader has a receiver for receiving grain discharged from the grain tank, and a conveying section selectively extendable to the opposite sides of the harvester.

The invention in still another form is directed to a method for unloading an agricultural harvester having a grain tank with grain therein. The method includes steps of adjusting an extendable conveyor to extend optionally to opposite sides of the harvester; extending the conveyor to a desired optional length; elevating the end of the conveyor to a desired optional elevational height; and operating the conveyor to transport grain from the grain tank off the end of the conveyor.

The invention in yet another form thereof is directed to a belted grain unloading conveyor for an agricultural harvester having a grain tank thereon positioned between opposite sides of the harvester. The conveyor includes telescopic conveyor support sections optionally extendable to opposite sides of the harvester; a festoon accumulator; and a conveyor belt entrained about the telescopic conveyor support sections and the festoon accumulator for operating at variable extended lengths to opposite sides of the harvester.

BRIEF DESCRIPTION OF THE DRAWINGS

FIG. 6 is a schematic illustration of a harvester with an unloader of the present invention extended to one side of the harvester;

FIG. 7 is a schematic illustration similar to that of FIG. 6, but illustrating the unloader extended to the side opposite the side to which it is extended in FIG. 7.

DETAILED DESCRIPTION OF THE INVENTION

Figure 1:
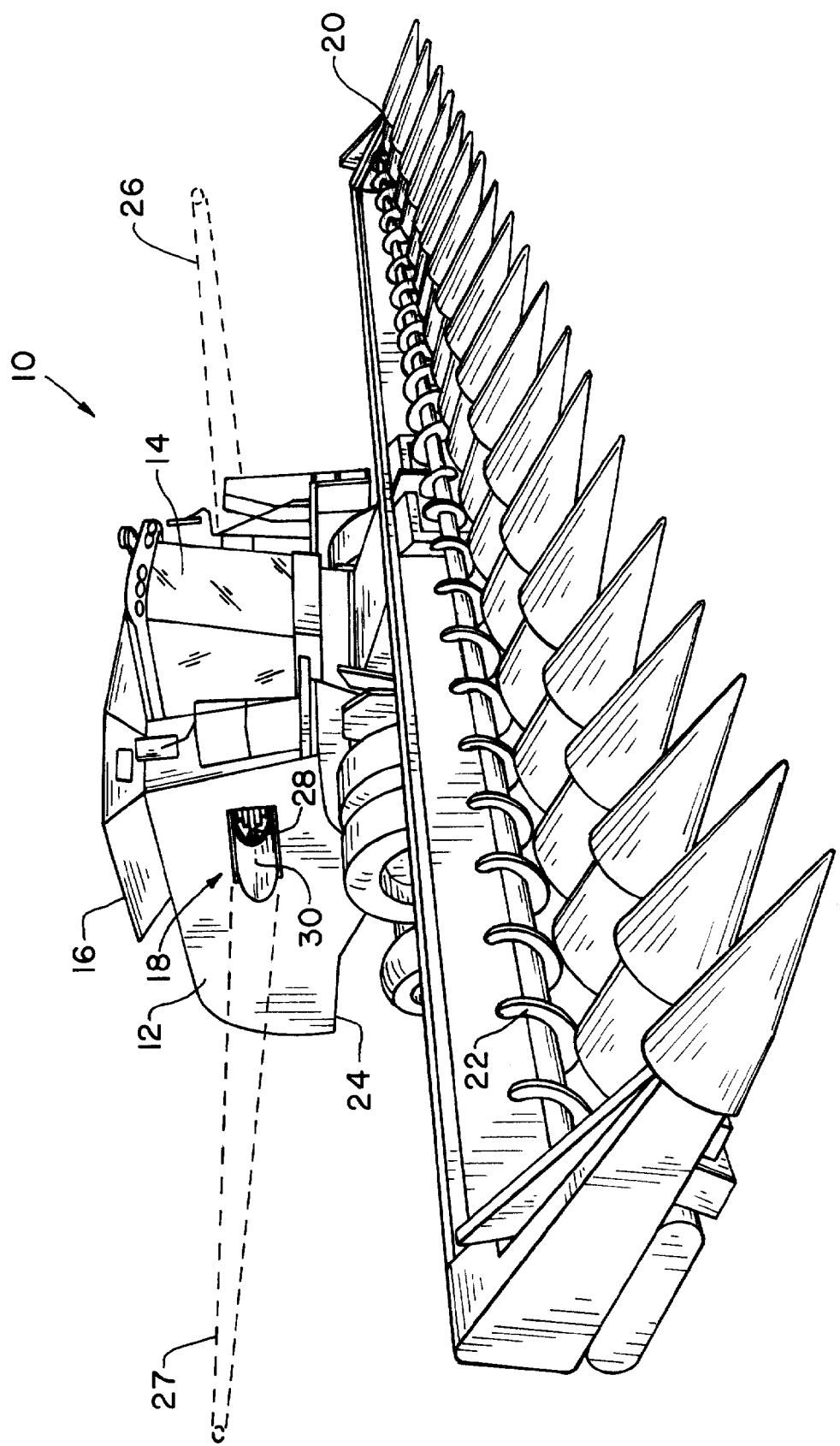
FIG. 1 is a perspective view of an agricultural harvester including an embodiment of an unloader of the present invention.

Referring now to the drawings, and more particularly to FIG. 1, there is shown an embodiment of an agricultural harvester 10. Harvester 10 generally includes a body 12, an operator cab 14, a grain tank 16 and an unloader 18. At the front thereof, harvester 10 is detachably coupled with a cutting platform or head 20 having an auger 22 in front of operator cab 14. A crop material is cut from a field at head 20 and is transported from the head by auger 22 into a separator within harvester 10. The desirable grain material is separated from the undesirable crop refuse, with the grain being transported into grain tank 16 and the non-grain or refuse crop material being discharged back onto the field using a chopper 24 at the back of harvester 10.

Unloader 18 is depicted in FIG. 1 in a stored condition within harvester 10 and is extendable outwardly from harvester 10 to either of the opposite sides thereof, as indicated by dotted lines 26 and 27, when grain from grain tank 16 is unloaded to a vehicle, such as a semi-trailer, gravity wagon, straight truck, etc. Unloader 18 in the exemplary embodiment illustrated is an extendable belted conveyor including an extendable conveyor support structure 28 and an endless conveyor belt 30.

Figure 2:
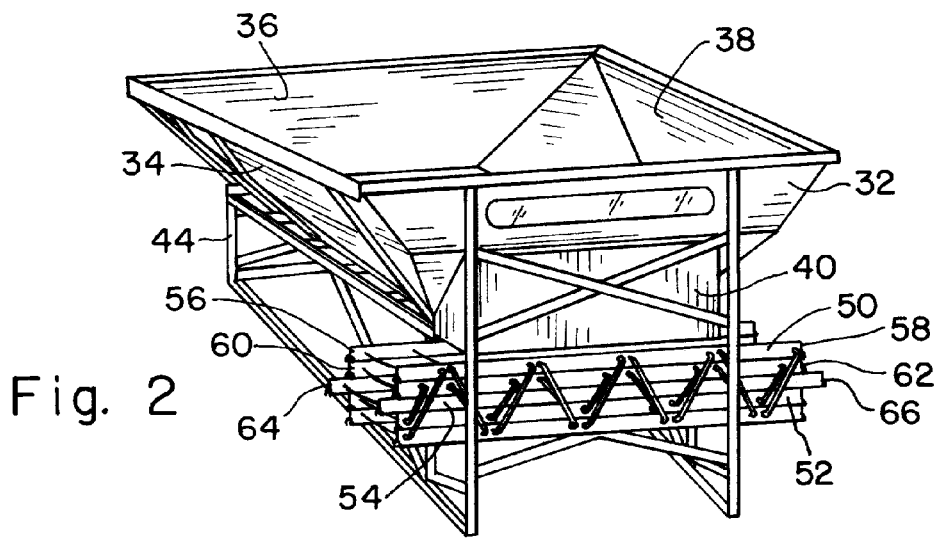
FIG. 2 is a perspective view of a grain tank and an unloader of the present invention, with the unloader in a stowed position.
Figure 3:
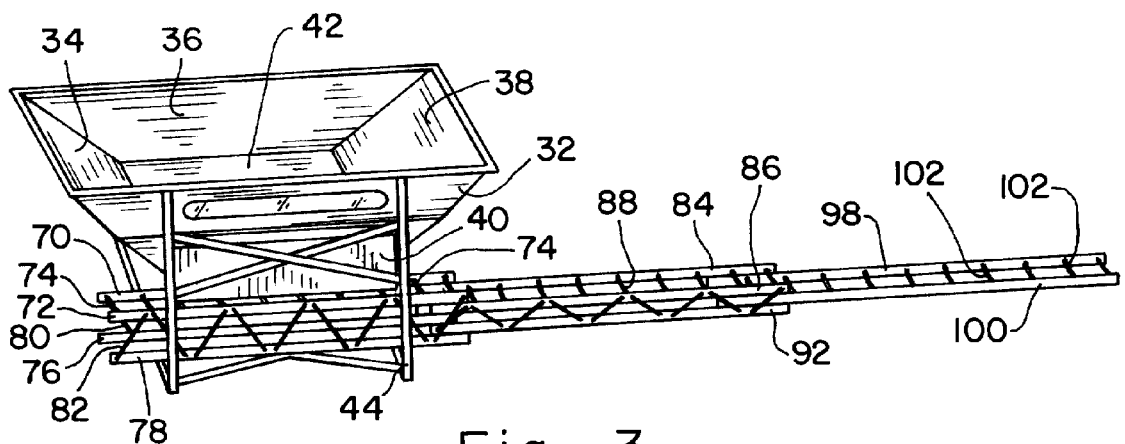
FIG. 3 is a perspective view of the grain tank and unloader of FIG. 2, illustrating the unloader extended to one side of the grain tank.
Figure 4:
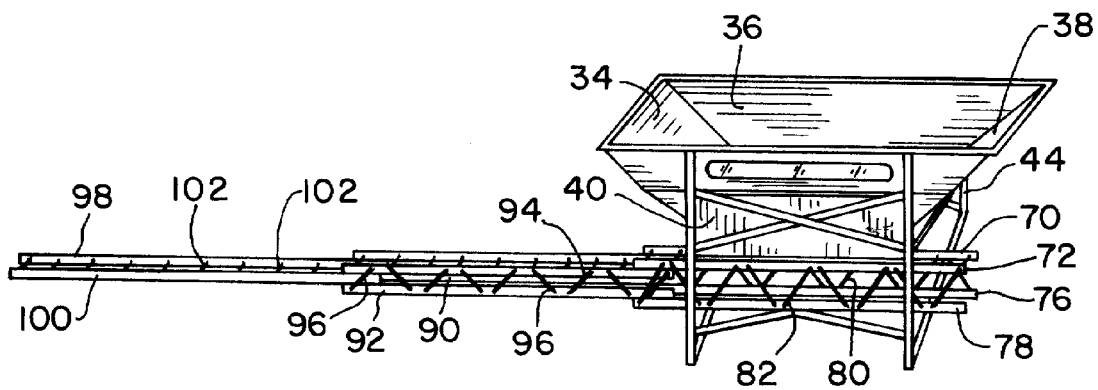
FIG. 4 is a perspective view similar to that of FIG. 3, but illustrating the unloader extended to the opposite side of the grain tank from that shown in FIG. 3.

FIGS. 2, 3 and 4 illustrate the relationship and operation of grain tank 16 and conveyor support structure 28. Grain tank 16 includes sloping walls 32, 34, 36 and 38 defining a grain receiving bin or hopper having an outlet 40 including a door to selectively cover or expose an opening through which grain passes from grain tank 16 by gravity flow. A floor 42 is provided at the bottom of walls 32, 34, 36, 38 and slopes toward outlet 40 for emptying of grain tank 16. Grain tank 16 is supported on a frame 44 secured within harvester 10.

A portion of conveyor support structure 28 is positioned beneath outlet 40 and supports endless belt 30 in position for receiving thereon the grain flowing out of outlet 40. In the exemplary embodiment shown, conveyor support structure 28 includes an outer section 50, an intermediate section 52 telescopically received within outer section 50 and an inner section 54 telescopically received within intermediate section 52. In the exemplary conveyor support structure shown having three sections thereto, outer section 50 is a receiving section of the unloader, and is in fixed position with respect to grain tank 16 and outlet 40 therefrom. Outer section 50 supports conveyor belt 30 to receive grain from outlet 40. Intermediate section 52 and inner section 54 can be extended outwardly from either end of outer section 50, and thereby outwardly from opposite sides of harvester 10. Fixed outer section 50 has opposite ends 56, 58, and intermediate section 52 can be extended outwardly from outer section 50 at either end 56, 58 thereof. Intermediate section 52 has opposite ends 60, 62, and inner section 54 can be extended outwardly from intermediate section 52 at either end 60, 62 thereof. Opposite ends 64, 66 of inner section 54 define the distal end of the belted conveyor when extended to opposite sides of harvester 10.

Outer section 50 includes an upper structure having lateral stiles 70, 72 spaced from one another, and a plurality of conveyor belt supports 74 disposed between stiles 70 and 72. Some, but not all conveyor belt supports 74 have been designated with reference numerals in the drawings. Conveyor belt supports 74 support endless belt 30 passing there over, and can be rotatable rollers or fixed support members over which belt 30 slides, as those familiar with belted conveyors will readily understand. Outer section 50 further includes a lower structure including lower stiles 76 and 78 disposed generally below and spaced from upper stiles 70 and 72. A plurality of brace members 80 are disposed between upper stile 70 and lower stile 76, and a plurality of brace members 82 are disposed between upper stile 72 and lower stile 78. Accordingly, outer section 50 defines a general framework within which intermediate section 52 and inner section 54 are slidably disposed.

Intermediate section 52 includes an upper structure having lateral stiles 84, 86 and a plurality of conveyor belt supports 88 disposed therebetween. Conveyor belt supports 88 are similar to conveyor belt supports 74. Some, but not all conveyor belt supports 88 have been depicted with reference numerals in the drawings. Intermediate section further includes lower stiles 90, 92 disposed below intermediate section upper stiles 84, 86, and a plurality of intermediate section brace members 94, 96 are connected between stile pairs 84, 90 and 86, 92. Accordingly, intermediate section 52 is constructed similarly to outer section 50 but sufficiently smaller so as to slide within outer section 50.

Inner section 54 includes lateral stiles 98, 100 spaced from one another, with a plurality of conveyor belt supports 102 connected therebetween. Conveyor belt supports 102 are similar to conveyor belt supports 74 and 88 described previously. Some, but not all conveyor belt supports 102 have been depicted with reference numerals in the drawings.

Figure 5:
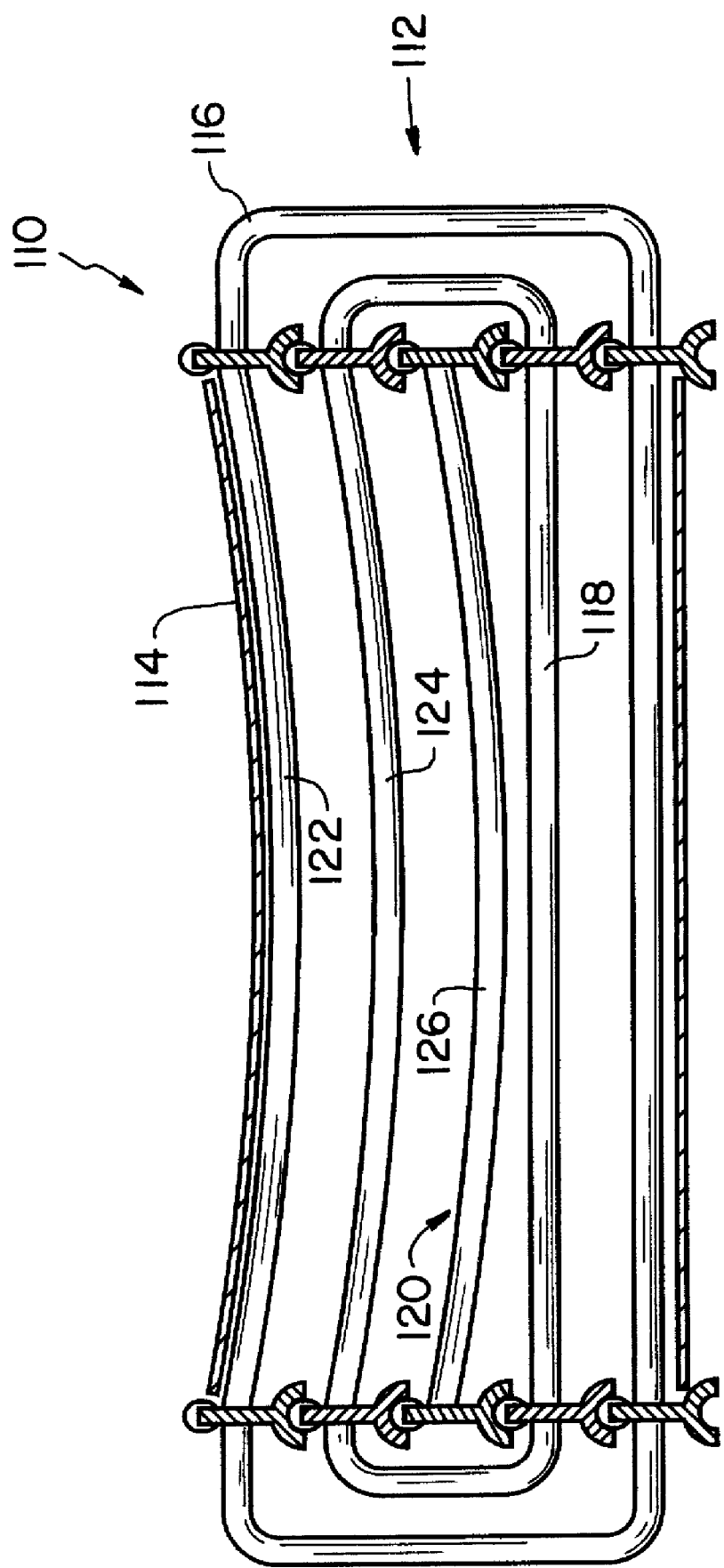
FIG. 5 is a cross-sectional view of an unloader of the present invention.

FIG. 5 illustrates an embodiment of the present invention in which a belted conveyor 110 includes a conveyor support structure 112 supporting an endless conveyor belt 114. Conveyor support structure 112 includes an outer section 116, an intermediate section 118 and an inner section 120. Outer section 116 includes a concave conveyor belt support 122. Intermediate section 118 includes a concave conveyor belt support 124 and inner section 120 includes a concave conveyor belt support 126. Accordingly, along the grain carrying extent thereof, endless conveyor belt 114 defines a concave elongated pocket for receiving and holding grain thereon.

Figure 8:
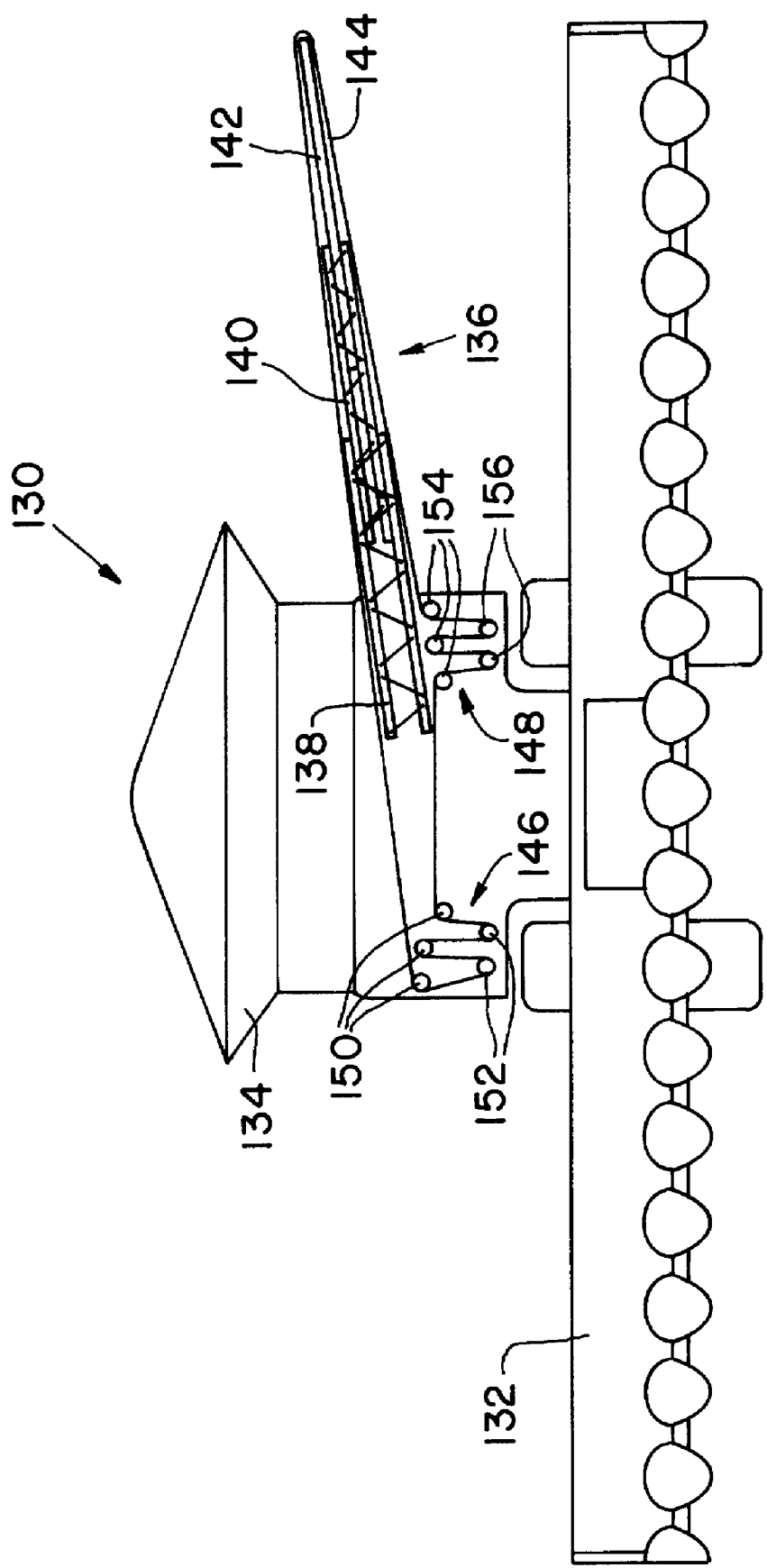
FIG. 8 is a schematic illustration similar to FIG. 7 but illustrating the unloader only partially extended.

A feature of the present invention is that the extendable unloader can be operated at various extended lengths and at various adjusted elevations. FIGS. 6, 7 and 8 illustrate in schematic form the length and elevation adjustment of the belted conveyor unloader of the present invention. As shown in FIGS. 6, 7 and 8, a harvester 130 having a head 132 and a grain tank 134 includes an endless belt conveyor unloader 136 that is elevationally adjustable and axially extendable.

Endless belt conveyor unloader 136 includes an outer conveyor support section 138, an intermediate support section 140 and inner support section 142 in telescopic relationship as described previously. An endless conveyor belt 144 is operationally disposed there around.

Endless conveyor belt 144 is further entrained about and extended through first and second festoon accumulators 146, 148. Festoon accumulator 146 includes a plurality of upper rolls 150 and a plurality of lower rolls 152. Festoon accumulator 148 includes a plurality of upper rolls 154 and a plurality of lower rolls 156. Upper rolls 150 and lower rolls 152 define a serpentine path through festoon accumulator 146. Upper rolls 154 and lower rolls 156 define a serpentine path through festoon accumulator 148. Within festoon accumulator 146, some or all of upper rolls 150 and/or lower rolls 152 are vertically adjustable so that the distance between some or all upper rolls 150 and some or all lower rolls 152 can be decreased or increased so that the length of the serpentine path defined therethrough can be shortened or lengthened as belted conveyor 136 is extended or retracted. Similarly, some or all of upper rolls 154 and/or lower rolls 156 within festoon accumulator 148 are vertically adjustable so that the distance between some or all upper rolls 154 and some or all lower rolls 156 can be decreased or increased so that the length of the serpentine path defined therethrough can be shortened or lengthened as belted conveyor 136 is extended or retracted. Festoon accumulators 146, 148 maintain proper operational tension in endless belt 144 in a fully extended position as shown in FIGS. 6 and 7 and in any lesser extended position, such as that position shown in FIG. 8, and regardless of the side to which belted conveyor 136 is extended.

Further, unloaders of the present invention are vertically adjustable for depositing grain from the distal ends thereof to receiving vehicles of various heights. Accordingly, FIGS. 6 and 7 illustrate endless belt conveyor 136 extended to opposite sides of harvester 130 and at lower elevations therefore. Dotted lines 158, 160 illustrate upper fully extended positions to opposite sides of the harvester.

FIG. 8 illustrates endless belt conveyor 136 extended to a shorter length, with festoon accumulators 146, 148 adjusted to take up the length of endless belt 144 to maintain proper operating tension. Accordingly, endless belt conveyor 136 can be operated at a variable extended length and at a variable elevation between operational minimums and maximums for extension and elevation.

During an unloading operation, a receiving vehicle can be positioned to either side of the harvester and an unloader of the present invention can be extended to a desired length and a desired elevation for proper deposit of grain in the receiving vehicle. The present invention allows the harvester to be operated back and forth from one end of a field to another end thereof, with unloading occurring on opposite sides of the harvester on each successive pass.

Having described the preferred embodiment, it will become apparent that various modifications can be made without departing from the scope of the invention as defined in the accompanying claims.

The invention claimed is:

1. An agricultural harvester having a front, a back and first and second opposite sides;
   a grain tank on said harvester for receiving harvested grain; and
   an unloader for moving grain received from said grain tank off said harvester, said unloader being extendable to each the first side and the second side of said harvester, said unloader including an endless belt positioned to receive the grain directly from said grain tank, said unloader having a distal end, said endless belt conveying the grain from said grain tank to said distal end, said unloader also including a section having a first end and an opposite second end, said first end being said distal end when said unloader extends to said first side, said second end being said distal end when said unloader extends to said second side.

2. The agricultural harvester of claim 1, said distal end being vertically adjustable.

3. The agricultural harvester of claim 1, said section being alternately extendable to either of said first and second sides of said harvester.

4. The agricultural harvester of claim 3, further comprising a festoon accumulator providing operating tension for said belt at variable extended lengths of said conveyor, said endless belt being a single endless belt.

5. The agricultural harvester of claim 3, wherein said section is an inner section, said unloader further including an outer section, said inner section telescopically received within said outer section.

6. The agricultural harvester of claim 5, one of said sections being fixed in cross-machine position on said harvester and at least another section being extendable a variable distance outwardly from either end of said section fixed in position.

7. The agricultural harvester of claim 5, wherein said unloader further includes an intermediate section telescopically received in said outer section, and said inner section telescopically received in said intermediate section, said intermediate section being extendable a variable distance outwardly from either end of said outer section, and said inner section being extendable a variable distance outwardly from either end of said intermediate section.

8. The agricultural harvester of claim 7, wherein said unloader further includes a festoon accumulator providing operating tension for said belt at variable extended lengths of said intermediate section and said inner section.

9. The agricultural harvester of claim 7, said intermediate section and said outer section being vertically adjustable.

10. The agricultural harvester of claim 7, said outer section being fixed in cross-machine position on said harvester.

11. An unloader for an agricultural harvester having a grain tank thereon positioned between opposite sides of the harvester, said unloader comprising:
    a receiver for receiving grain discharged from the grain tank;
    a conveying section selectively extendable to a first side of the harvester and to an opposite second side of the harvester; and
    an endless belt receiving grain directly from the grain tank in said receiver, said conveying section having a first distal end when said conveying section is extended to said first side and a second distal end when said conveying section is extended to said second side, said endless belt conveying the grain from said receiver to one of said first distal end and said second distal end.

12. The unloader of claim 11, said receiver and said conveying section being sections of a conveyor.

13. The unloader of claim 12, said conveyor including multiple telescopically received conveyor support sections, a festoon accumulator, said endless belt being entrained in said festoon accumulator providing operating tension for said belt at variable extended operating lengths of said conveyor support sections.

14. The unloader of claim 12, including at least one conveyor support section that is vertically adjustable.

15. The unloader of claim 12, said conveyor including an outer section, an intermediate section telescopically received in said outer section, and an inner section telescopically received in said intermediate section, said intermediate section being extendable a variable distance outwardly from either end of said outer section, and said inner section being extendable a variable distance outwardly from either end of said intermediate section.

16. The unloader of claim 15, said outer section being fixed in cross-machine position on the harvester.

17. A method for unloading an agricultural harvester having a grain tank with grain therein, said method comprising the steps of:
    operating an extendable conveyor to extend optionally to a first side of the harvester and to an opposite second side of the harvester;
    extending the conveyor to a desired optional length, the conveyor having a section with a first end and an opposite second end, the first end being an end of the conveyor when the conveyor extends to the first side, the second end being the end of the conveyor when the conveyor extends to the second side;
    elevating the end of the conveyor to a desired optional elevational height;
    receiving grain from beneath the grain tank onto an endless belt; and
    operating the endless belt to transport grain from the grain tank off the end of the conveyor.

18. The method of claim 17, including extending multiple telescopic sections of the conveyor to the desired optional length.

19. A belted grain unloading conveyor for an agricultural harvester having a grain tank thereon positioned between opposite sides of the harvester, said conveyor comprising:
    telescopic conveyor support sections optionally extendable to a first side of the harvester and to an opposite second side of the harvester, said conveyor support sections including an inner section with a first end and an opposite second end, the first end being an end of the unloading conveyor when the unloading conveyor extends to the first side, the second end being the end of the unloading conveyor when the unloading conveyor extends to the second side;

a festoon accumulator; and a conveyor belt entrained about said telescopic conveyor support sections and said festoon accumulator for operating at variable extended lengths to opposite sides of the harvester, said conveyor belt positioned to receive grain from beneath the grain tank, said conveyor belt conveying the grain to the end of the unloading conveyor.

20. The unloading conveyor of claim 19, one conveyor support section being in a fixed position on the harvester, and at least one other conveyor support section optionally extendable from opposite ends of said one conveyor support section.

* * * * *